US009410693B2

(12) United States Patent
Cohen

(10) Patent No.: US 9,410,693 B2
(45) Date of Patent: Aug. 9, 2016

(54) SOLAR-POWERED, ILLUMINATED DECORATOR BALLS

(71) Applicant: RSR Sales, Inc., Ann Arbor, MI (US)

(72) Inventor: Richard Cohen, Ann Arbor, MI (US)

(73) Assignee: RSR Sales, Inc., Ann Arbor, MI (US)

( * ) Notice: Subject to any disclaimer, the term of this patent is extended or adjusted under 35 U.S.C. 154(b) by 0 days.

(21) Appl. No.: 14/256,071

(22) Filed: Apr. 18, 2014

(65) Prior Publication Data

US 2014/0313704 A1   Oct. 23, 2014

Related U.S. Application Data

(60) Provisional application No. 61/813,391, filed on Apr. 18, 2013.

(51) Int. Cl.
| F21S 4/00 | (2016.01) |
| F21V 33/00 | (2006.01) |
| F21S 9/03 | (2006.01) |
| F21V 21/08 | (2006.01) |
| A47G 33/08 | (2006.01) |
| F21W 121/00 | (2006.01) |
| F21Y 101/02 | (2006.01) |

(52) U.S. Cl.
CPC ............ *F21V 33/0028* (2013.01); *A47G 33/08* (2013.01); *F21S 9/035* (2013.01); *F21V 21/0832* (2013.01); *A47G 2033/0827* (2013.01); *F21W 2121/00* (2013.01); *F21Y 2101/02* (2013.01)

(58) Field of Classification Search
USPC ........................................................ 362/565
See application file for complete search history.

(56) References Cited

U.S. PATENT DOCUMENTS

| D510,498 | S | 10/2005 | Essig, Jr. et al. | |
| 6,971,779 | B2* | 12/2005 | Tau et al. | 362/555 |
| 7,252,889 | B2 | 8/2007 | Kao | |
| 7,513,638 | B2* | 4/2009 | Allsop et al. | 362/183 |
| 7,708,424 | B2 | 5/2010 | Richmond | |
| 7,784,956 | B2 | 8/2010 | Cohen | |
| 8,192,044 | B2 | 6/2012 | Allsop et al. | |
| 8,262,245 | B1* | 9/2012 | Richmond | 362/183 |
| 8,514,094 | B2 | 8/2013 | Richmond | |
| 8,657,461 | B2 | 2/2014 | Allsop et al. | |
| 2002/0126506 | A1 | 9/2002 | Syme | |
| 2006/0279956 | A1* | 12/2006 | Richmond | 362/374 |
| 2008/0074867 | A1* | 3/2008 | Chen | F21S 6/001 362/183 |
| 2012/0113629 | A1 | 5/2012 | Steele | |
| 2012/0243213 | A1* | 9/2012 | Chen | H05B 33/0809 362/183 |

FOREIGN PATENT DOCUMENTS

WO          2011153498 A2   12/2011

* cited by examiner

*Primary Examiner* — Sean Gramling
(74) *Attorney, Agent, or Firm* — Dinsmore & Shohl LLP

(57) ABSTRACT

Decorator balls are illuminated from the inside-out using a self-contained, battery-powered LED module. The decorator ball itself is made from one or more elongated elements creating a hollow form with gaps or apertures in areas where the elements do not overlap. The module has a battery powered light-emitting diode (LED) and a solar panel to charge the battery. The module is coupled to the decorator ball such that the LED illuminates the decorator ball from the inside-out. White LEDs, LEDs of a particular color, or color-changing LEDs may be used. Either the solar panel or an additional photodetector may communicate with electronic circuitry within the module to activate the LED when ambient light falls below a predetermined level. The module may include a hanger for hanging the decorative article, and a reflector may be provided within the decorator ball to diverge and disperse the light from the LED.

9 Claims, 4 Drawing Sheets

SOLAR-POWERED, ILLUMINATED DECORATOR BALLS

REFERENCED TO RELATED APPLICATION

This application claims priority from U.S. Provisional Patent Application Ser. No. 61/813,391, filed Apr. 18, 2013, the entire content of which is incorporated herein by reference.

FIELD OF THE INVENTION

This invention relates generally to home and garden decor and, in particular, to solar-powered, illuminated "decorator balls."

BACKGROUND OF THE INVENTION

So-called "decorator balls" are spherical forms composed of overlapping filamentary materials with gaps between the filaments. These balls range in size from a couple inches to a foot in diameter. Such overlapping materials may include "seagrass" or other plant-based materials such as jute, wicker, twigs, etc., as well as wire frames. Currently no such decorator ball are illuminated from the inside out.

SUMMARY OF THE INVENTION

This invention resides in decorator balls illuminated from the inside-out using a self-contained, battery-powered LED module. The invention is applicable to decorator balls constructed from "seagrass" or other plant-based materials such as jute, wicker, twigs, etc.; wire frames; as well as molded plastic or ceramic decorator balls that do not have overlapping materials so long as the form has gaps through which the light from within the ball can emerge. FIGS. 1-3 illustrate commercially available decorator balls to which this invention is applicable, without limitation in terms of materials, construction, or size.

A decorative article constructed in accordance with the invention includes a decorator ball made from one or more elongated elements creating a hollow form with gaps or apertures through the form in areas where the elements do not overlap. A module having a battery powered light-emitting diode (LED) and a solar panel to charge the battery is coupled to the decorator ball such that the LED illuminates the decorator ball from the inside-out.

The decorator ball may be constructed to provide the opening for the solar-powered module, or the opening may be cut into an existing decorator ball. Any type of lighting may be used, including white LEDs, LEDs of a particular color, or color-changing LEDs. Either the solar panel or an additional photodetector may communicate with electronic circuitry within the module to activate the LED when ambient light falls below a predetermined level. The module may include a hanger for hanging the decorative article, and a reflector may be provided within the decorator ball to diverge and disperse the light from the LED.

DETAILED DESCRIPTION OF THE INVENTION

Figure 1:
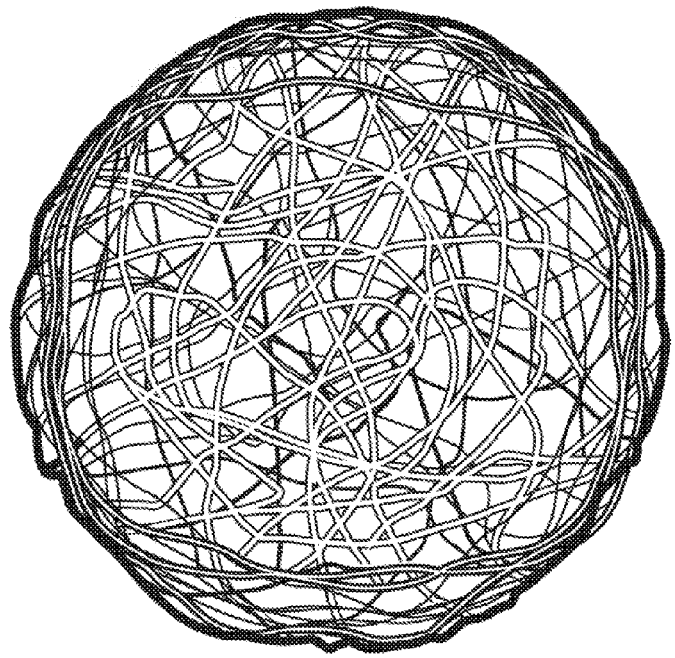
FIG. 1 shows a prior-art decorator ball made from a plant-based material that is applicable to the invention.
Figure 2:
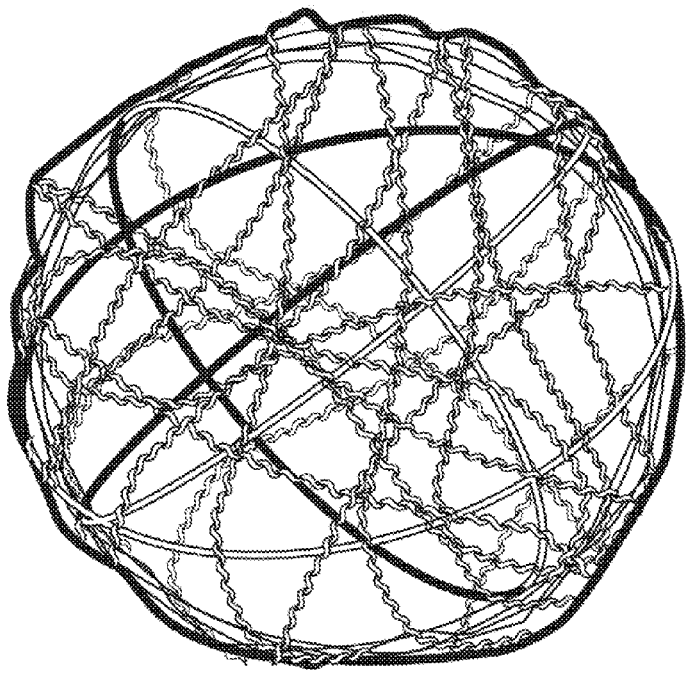
FIG. 2 shows a prior-art decorator ball made from twisted wire that is applicable to the invention.
Figure 3:
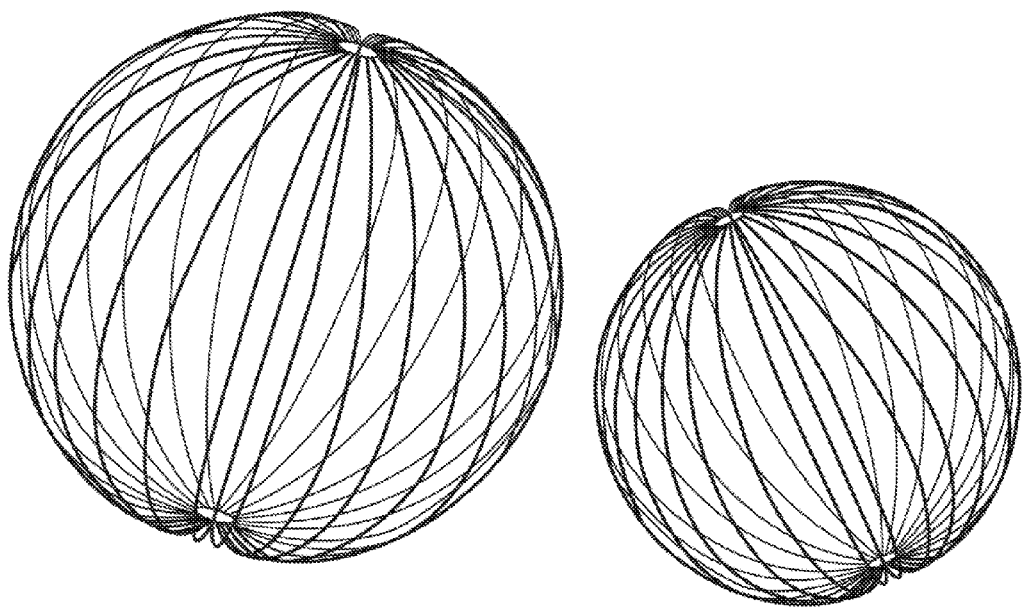
FIG. 3 shows a different style of prior-art decorator ball made from wire that is applicable to the invention.
Figure 4:
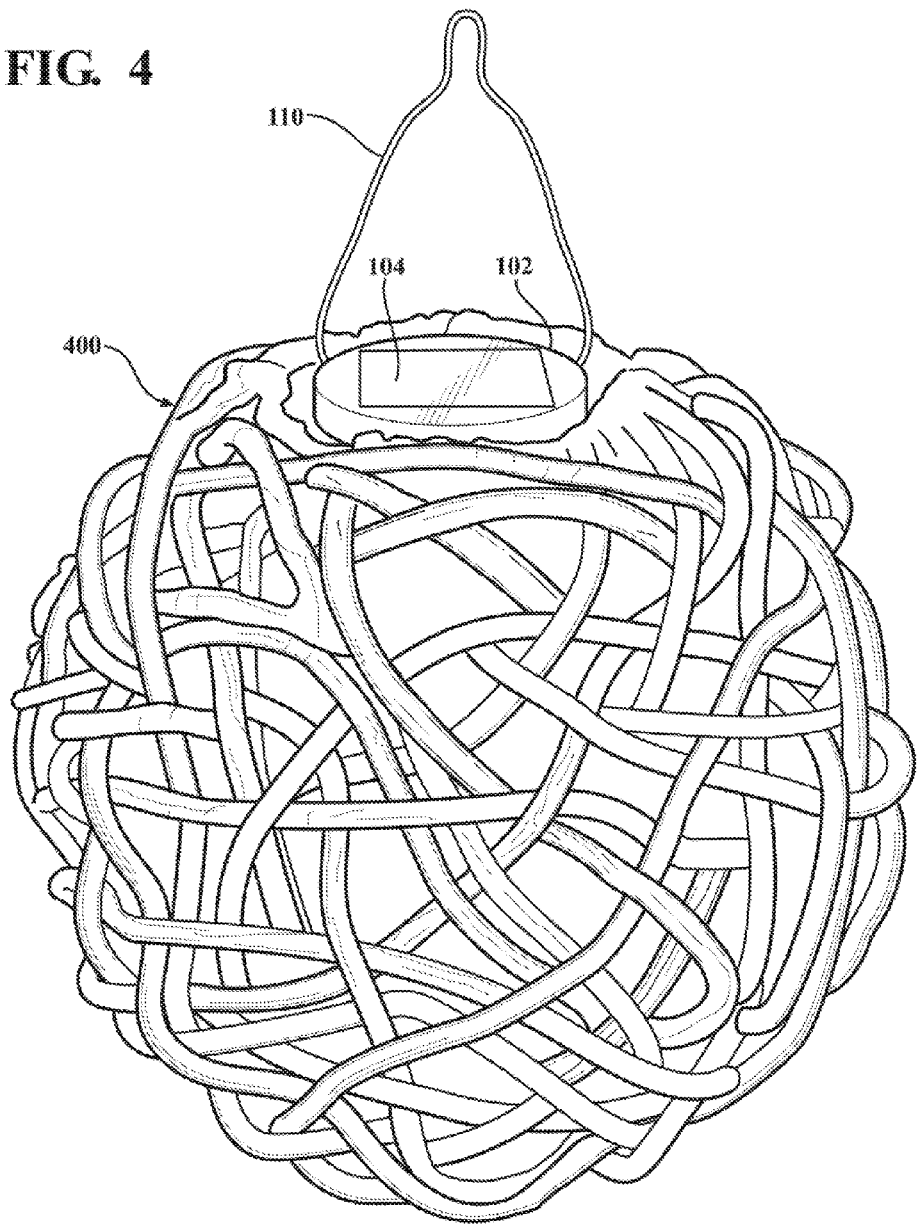
FIG. 4 illustrates a preferred embodiment of the invention.

In accordance with this invention, a decorator ball is illuminated from the inside out using a solar-powered module. As shown in FIG. 4, module 102 is mounted into an opening in the ball 400. Custom balls may be constructed to provide a suitable opening having a diameter on the order of 2 to 4 inches, or an opening may be cut into the form to accept the module 102. The opening and the corresponding outer surface of the module are preferably generally circular/cylindrical. Holt-melt glue or any other appropriate method such as that described with reference to FIG. 5 may be used for supporting the module within or onto the decorator ball. The module 102 preferably includes a handle 110 for hanging the completed assembly.

The module 102 includes an outer surface with one or more solar panels 104, and an inner surface facing into the ball once mounted. The inner surface includes one or more light-emitting diodes (LEDs) that illuminate the form from the inside-out through the gaps in the filamentary material(s) used to make the ball 400. The solar panel or an additional photodetector may communicate with electronic circuitry (not shown) within the module to activate the LED when ambient light falls below a predetermined level. The module may include an ON/OFF switch though this may not be necessary insofar as the article will operate automatically if sunlight is present.

Figure 5:
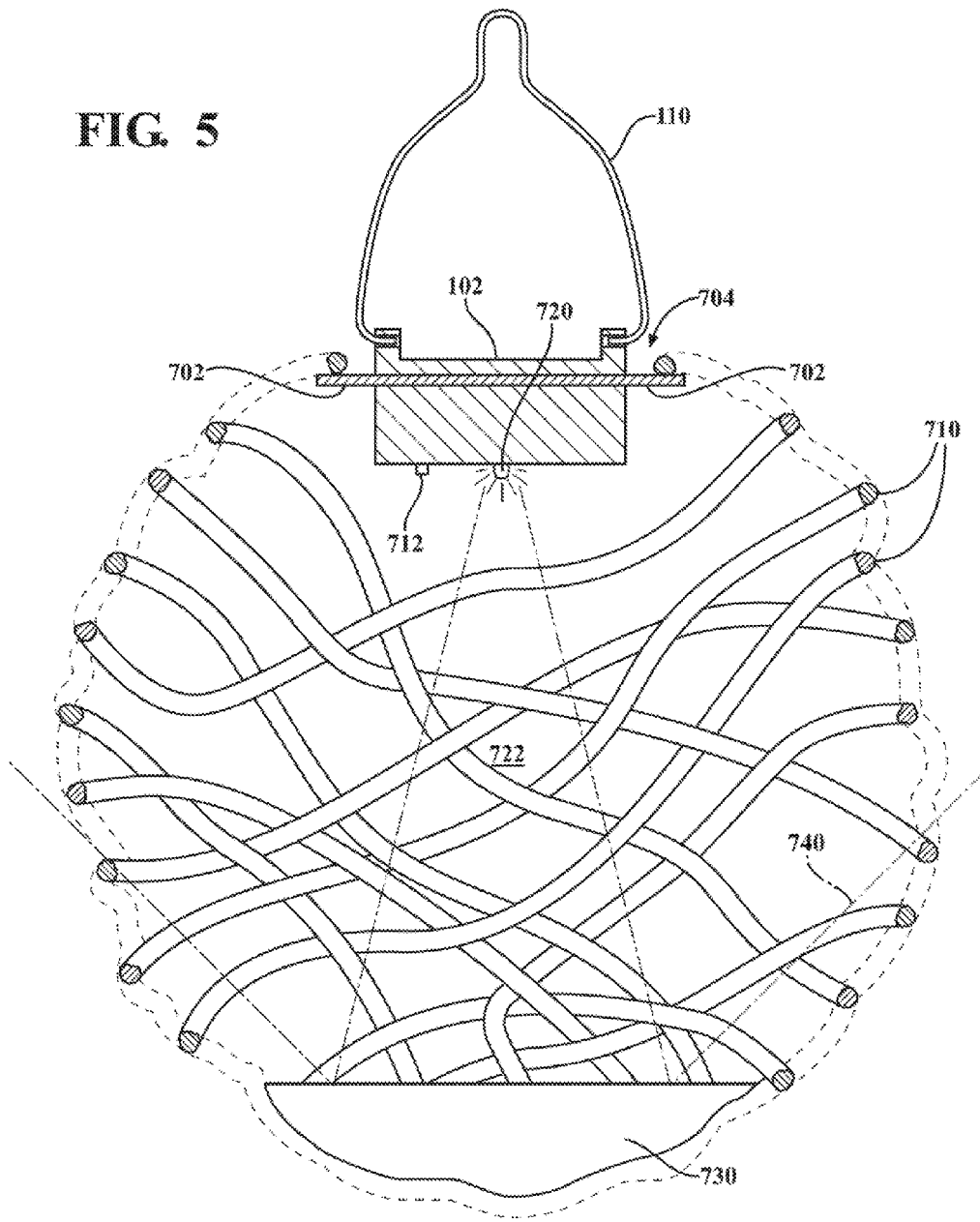
FIG. 5 is a view in partial cross section showing the use of an optional reflector.

FIG. 5 is a cross section of a preferred embodiment of the invention. The module 102 in this case may include a flexible or semi-flexible ring 702 having a diameter larger than that of the top opening in the decorative ball 710. This allows a user to pull the module partially or completely out of the opening to activate ON/OFF switch 712, then re-insert the module such that it is held in position as shown when hung by hanger 110. The LED is shown at 720. Particularly in the event the LED has a narrower beam shape 722, a reflector 730 may be added to the inside bottom of the form to better disperse the light indicated by cone 740. Such a reflector is preferably a thin piece of metalized mylar or foil.

The invention claimed is:

1. A decorative article, comprising:
   a decorator ball made from one or more elongated, interwoven elements creating a hollow form with a plurality of regions where the interwoven elements overlap and a plurality of gaps or apertures through the form in areas where the elements do not overlap;
   an opening formed or cut into the decorator ball to receive a housing having top and bottom surfaces;
   a rechargeable battery disposed within the housing;
   a solar panel disposed on the top surface of the housing to charge the battery;
   a light-emitting diode (LED) powered by the battery, the LED being disposed on the bottom surface of the housing;
   wherein the housing is coupled to the decorator ball such that the LED illuminates the decorator ball from the inside-out; and
   wherein the form is constructed only from the elongated, interwoven elements, such that light from the LED radiates directly and unimpeded through the plurality of gaps or apertures through the form.

2. The decorative article of claim 1, wherein the elongated elements of the decorator ball are composed of plant-based fibers.

3. The decorative article of claim 1, wherein the elongated elements of the decorator ball are composed of metal wire.

4. The decorative article of claim 1, wherein the LED is a white LED.

5. The decorative article of claim 1, wherein the LED is a color-changing LED.

6. The decorative article of claim 1, wherein the solar panel or an additional photodetector communicates with electronic circuitry within the housing to activate the LED when ambient light falls below a predetermined level.

7. The decorative article of claim 1, wherein the housing includes a hanger for hanging the decorative article.

8. The decorative article of claim 1, further including a reflector within the decorator ball to diverge and disperse the light from the LED.

9. The decorative article of claim 1, wherein the decorator ball is generally spherical.

\* \* \* \* \*